(12) United States Patent
Okita (10) Patent No.: US 12,453,463 B2
(45) Date of Patent: Oct. 28, 2025

(54) RIGIDITY VARIABLE APPARATUS, ENDOSCOPE, AND MANUFACTURING METHOD OF RIGIDITY VARIABLE APPARATUS

(71) Applicant: OLYMPUS CORPORATION, Tokyo (JP)

(72) Inventor: Tatsuhiko Okita, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 409 days.

(21) Appl. No.: 18/095,768

(22) Filed: Jan. 11, 2023

(65) Prior Publication Data

US 2023/0157528 A1    May 25, 2023

Related U.S. Application Data (63) Continuation of application No. PCT/JP2020/027370, filed on Jul. 14, 2020.

(51) Int. Cl.
 *A61B 1/005* (2006.01)
 *A61B 1/31* (2006.01)
 *A61M 25/01* (2006.01)

(52) U.S. Cl.
 CPC .............. *A61B 1/0058* (2013.01); *A61B 1/31* (2013.01); *A61M 25/0158* (2013.01)

(58) Field of Classification Search
 CPC .... A61B 1/0058; A61B 1/31; A61M 25/0158; A61M 2205/0266
 See application file for complete search history.

(56) References Cited

U.S. PATENT DOCUMENTS

| | | | |
|---|---|---|---|
| 5,531,685 A | * | 7/1996 | Hemmer ........... A61M 25/0158 604/95.05 |
| 2017/0079508 A1 | | 3/2017 | Ikeda |
| 2019/0046008 A1 | | 2/2019 | Morishima |
| 2019/0248031 A1 | | 8/2019 | Takahashi |
| 2019/0313885 A1 | | 10/2019 | Okita |

(Continued)

FOREIGN PATENT DOCUMENTS

| JP | H0556910 A | 3/1993 |
|---|---|---|
| JP | H05207967 A | 8/1993 |

(Continued)

OTHER PUBLICATIONS

International Search Report dated Sep. 24, 2020 issued in PCT/JP2020/027370.

*Primary Examiner* — Aaron B Fairchild
(74) *Attorney, Agent, or Firm* — Scully, Scott, Murphy & Presser, P.C.

(57) ABSTRACT

A rigidity variable apparatus includes: a rigidity variable member having a cylindrical shape, a bending rigidity of the rigidity variable member increasing by being heated; a heater having a cylindrical shape and arranged along the rigidity variable member on an inside of the rigidity variable member in a radial direction, the heater being configured to heat the rigidity variable member; a filler arranged so as to fill a gap between the heater and the rigidity variable member in the radial direction, the filler being configured to transfer heat from the heater to the rigidity variable member; and a tube arranged along the heater on an inside of the heater in the radial direction.

20 Claims, 10 Drawing Sheets

(56) References Cited

U.S. PATENT DOCUMENTS

2020/0037853 A1    2/2020  Kitanaka
2021/0363977 A1*  11/2021  Okita .................. A61B 1/0052

FOREIGN PATENT DOCUMENTS

| | | |
|---|---|---|
| JP | H0667096 A | 3/1994 |
| JP | H07247954 A | 9/1995 |
| JP | H07320851 A | 12/1995 |
| JP | 2000233027 A | 8/2000 |
| JP | 2000262464 A | 9/2000 |
| JP | 2001123937 A | 5/2001 |
| JP | 2004121755 A | 4/2004 |
| JP | 2005168607 A | 6/2005 |
| JP | 2005185526 A | 7/2005 |
| JP | 2008200159 A | 9/2008 |
| JP | 2012239801 A | 12/2012 |
| JP | 2014167775 A | 9/2014 |
| JP | 2016007434 A | 1/2016 |
| JP | 2019001197 A | 1/2019 |
| WO | 2015198761 A1 | 12/2015 |
| WO | 2017094085 A1 | 6/2017 |
| WO | 2017183078 A1 | 10/2017 |
| WO | 2018083763 A1 | 5/2018 |
| WO | 2018096679 A1 | 5/2018 |
| WO | 2018189855 A1 | 10/2018 |
| WO | 2018189888 A1 | 10/2018 |
| WO | 2020161815 A1 | 8/2020 |

* cited by examiner

RIGIDITY VARIABLE APPARATUS, ENDOSCOPE, AND MANUFACTURING METHOD OF RIGIDITY VARIABLE APPARATUS

CROSS-REFERENCE TO RELATED APPLICATION

This application is a continuation application of PCT/JP2020/027370 filed on Jul. 14, 2020, the entire contents of which are incorporated herein by this reference.

BACKGROUND OF THE INVENTION

1. Field of the Invention

The present invention relates to a rigidity variable apparatus including a rigidity variable member having a cylindrical shape, a bending rigidity of which increases by being heated by a heater, and also relates to an endoscope and a manufacturing method of the rigidity variable apparatus.

2. Description of the Related Art

In recent years, endoscopes have been widely used in medical fields and industrial fields. Endoscopes are capable of performing observation, various kinds of treatment, and the like, of an inside of a subject or an object by inserting an elongated insertion portion into the subject or the object.

A known technique is to vary a rigidity of a flexible tube portion, which is provided on a proximal end side with respect to a bending portion, in an insertion portion of an endoscope.

Specifically, a configuration is known in which a rigidity variable apparatus is provided in a flexible tube portion, to allow the rigidity of the flexible tube portion to be variable by using the rigidity variable apparatus.

Also a configuration is known in which a plurality of rigidity variable apparatuses are provided in a flexible tube portion along a longitudinal axis direction of the flexible tube portion, and a bending rigidity of the flexible tube portion is increased, that is, the flexible tube portion is hardened, sequentially from a distal end toward a proximal end in the longitudinal axis direction by using the respective rigidity variable apparatuses.

Furthermore, as a known example of a rigidity variable apparatus, the rigidity variable apparatus has a configuration using a rigidity variable member, for example, a shape memory alloy (SMA), a bending rigidity of which increases by being heated.

A shape memory alloy has such a property that a given part can be hardened by being heated using a heater and can be softened by cooling.

In order to improve a hardening speed of a shape memory alloy, there has been a need for improving a heat transfer performance (efficiency) from the heater to the shape memory alloy.

In view of such a circumstance, WO2018/189888 discloses a rigidity variable apparatus having a configuration in which a cylindrical heater for heating a shape memory alloy is provided on an inside of a cylindrical shape memory alloy in a radial direction, a bending rigidity of the shape memory alloy increasing by being heated.

With such a configuration, the heater directly heats the shape memory alloy, to thereby be capable of improving the heat transfer performance from the heater to the shape memory alloy. As a result, the shape memory alloy can be hardened quickly.

SUMMARY OF THE INVENTION

A rigidity variable apparatus according to one aspect of the present invention includes: a rigidity variable member having a cylindrical shape, a bending rigidity of the rigidity variable member increasing by being heated; a heater having a cylindrical shape and arranged along the rigidity variable member on an inside of the rigidity variable member in a radial direction, the heater being configured to heat the rigidity variable member; a filler arranged so as to fill a gap between the heater and the rigidity variable member in the radial direction, the filler being configured to transfer heat from the heater to the rigidity variable member; and a tube arranged along the heater on an inside of the heater in the radial direction.

Further, an endoscope according to one aspect of the present invention includes: an insertion portion; and a rigidity variable apparatus provided in the insertion portion. The rigidity variable apparatus includes: a rigidity variable member having a cylindrical shape, a bending rigidity of the rigidity variable member increasing by being heated; a heater having a cylindrical shape and arranged along the rigidity variable member on an inside of the rigidity variable member in a radial direction, the heater being configured to heat the rigidity variable member; a filler arranged so as to fill a gap between the heater and the rigidity variable member in the radial direction, the filler being configured to transfer heat from the heater to the rigidity variable member; and a tube arranged along the heater on an inside of the heater in the radial direction.

Furthermore, a manufacturing method of a rigidity variable apparatus according to one aspect of the present invention includes: filling a filler into an inside of a rigidity variable member in a radial direction, the rigidity variable member being formed in a cylindrical shape having a first opening at one end portion, a bending rigidity of the rigidity variable member increasing by being heated, the filler being filled through the first opening; and passing a heater unit having a cylindrical shape through the first opening and pushing the heater unit into the inside of the rigidity variable member, the heater unit including a heater having a cylindrical shape and a tube arranged on an inside of the heater in the radial direction, to arrange the filler so as to fill a gap between an inner circumferential surface of the rigidity variable member and the heater.

DETAILED DESCRIPTION OF THE PREFERRED EMBODIMENT(S)

Hereinafter, embodiments of the present invention will be described with reference to drawings. Note that, in the embodiments to be described below, description will be made on an endoscope by taking a colonoscope for medical use as an example.

First Embodiment

Figure 1:
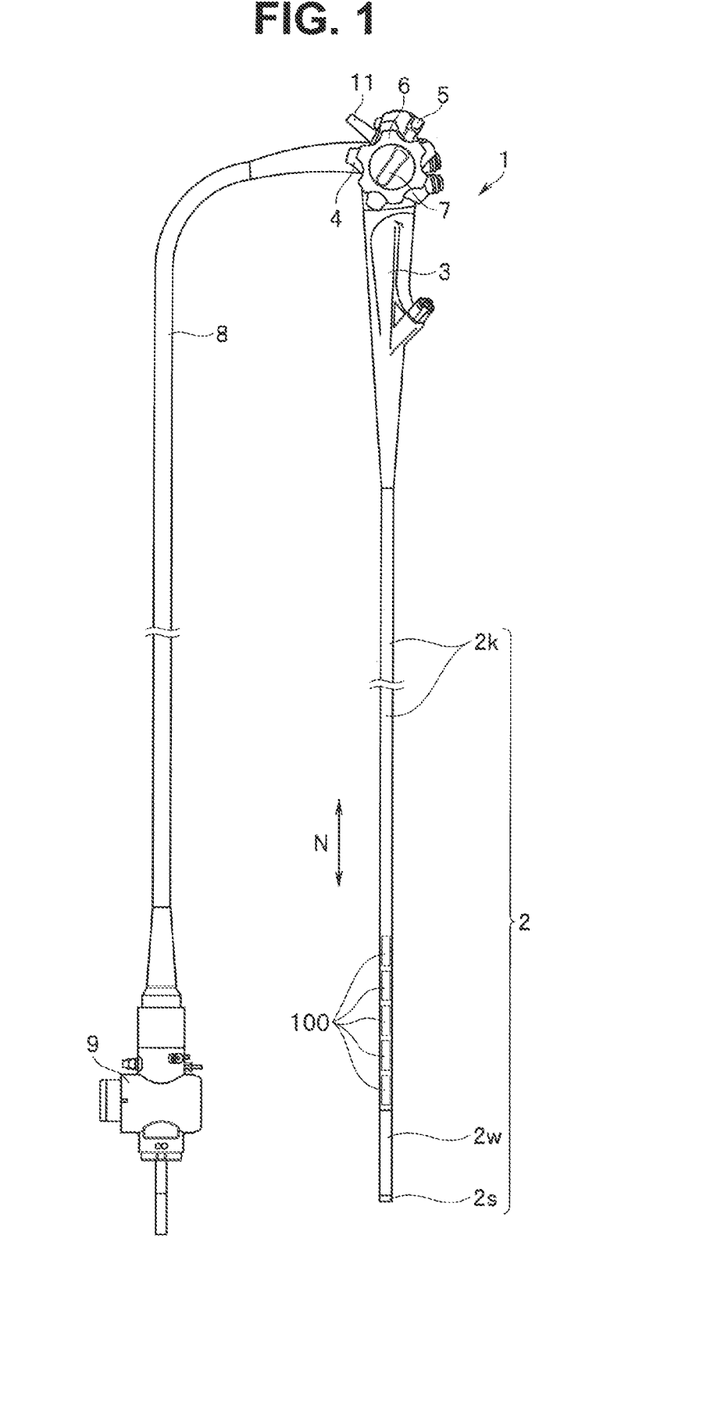
FIG. 1 is a view schematically showing an appearance of an endoscope including, in a flexible tube portion of an insertion portion thereof, rigidity variable apparatuses according to a first embodiment.

FIG. 1 is a view schematically showing an appearance of an endoscope including, in a flexible tube portion of an insertion portion thereof, rigidity variable apparatuses according to the present embodiment.

As shown in FIG. 1, an endoscope 1 has a main part configured by including: an insertion portion 2 configured to be inserted into a subject; an operation portion 3 provided continuously with a proximal end side of the insertion portion 2 in a longitudinal axis direction N; a universal cord 8 extended from the operation portion 3; and a connector 9 provided at an extension end of the universal cord 8.

Note that the endoscope 1 is electrically connected to external apparatuses such as a control apparatus and an illumination apparatus, through the connector 9.

The operation portion 3 is provided with a bending knob 4 and a bending knob 6. The bending knob 4 is configured to bend a bending portion 2w, to be described later, of the insertion portion 2 in up and down directions. The bending knob 6 is configured to bend the bending portion 2w in left and right directions. Furthermore, the operation portion 3 includes a fixing lever 5 and a fixing knob 7. The fixing lever 5 is configured to fix a rotation position of the bending knob 4. The fixing knob 7 is configured to fix a rotation position of the bending knob 6.

Furthermore, the operation portion 3 is provided with a rigidity variable switch 11 configured to harden a rigidity variable member 60 (see FIG. 2) of each of rigidity variable apparatuses 100 provided in a flexible tube portion 2k, to be described later, of the insertion portion 2.

The insertion portion 2 is configured of a distal end portion 2s, the bending portion 2w, and the flexible tube portion 2k, and is formed in an elongated shape along the longitudinal axis direction N.

The distal end portion 2s includes, inside thereof, an image pickup unit configured to observe an inside of a subject, an illumination unit configured to illuminate the inside of the subject (neither of them is shown), and the like.

The bending portion 2w is configured to be bent in four directions, for example, up, down, left, and right directions, by rotational operations of the bending knob 4 and the bending knob 6, to thereby vary the observation direction of the image pickup unit provided in the distal end portion 2s and improve an insertion performance of the distal end portion 2s in the subject.

Furthermore, the flexible tube portion 2k is provided continuously with a proximal end side of the bending portion 2w. In the flexible tube portion 2k, one or a plurality of rigidity variable apparatuses 100 are provided along the longitudinal axis direction N.

Note that FIG. 1 shows a case where five rigidity variable apparatuses 100 are provided in the flexible tube portion 2k. However, it is needless to say that the number of the rigidity variable apparatuses 100 is not limited to five. The rigidity variable apparatuses 100, the number of which corresponds to a size of a region a rigidity of which is desired to be varied, may be provided in the flexible tube portion 2k along the longitudinal axis direction N of the flexible tube portion 2k.

Next, description will be made on the configuration of the rigidity variable apparatus 100 with reference to FIGS. 2 to 4.

Figure 2:
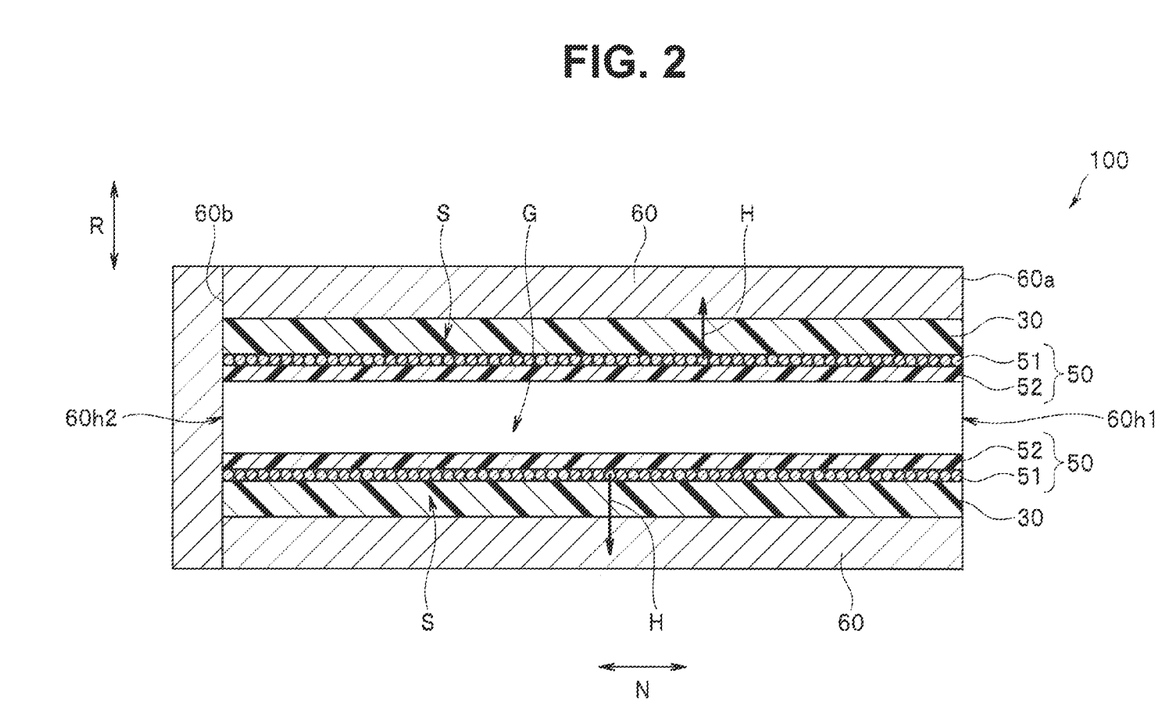
FIG. 2 is a cross-sectional view of one of the rigidity variable apparatuses provided in the flexible tube portion of the insertion portion of the endoscope in FIG. 1.

FIG. 2 is a cross-sectional view of one of the rigidity variable apparatuses provided in the flexible tube portion of the insertion portion of the endoscope in FIG. 1. FIG. 3 is a cross-sectional view of the rigidity variable apparatus having a configuration ideal for quickly hardening the rigidity variable member in FIG. 2. FIG. 4 is a cross-sectional view showing a state where a filler has been filled into an inside of the heater in FIG. 3.

As shown in FIG. 2, the rigidity variable apparatus 100 has a main part configured by including the rigidity variable member 60, a heater unit 50, and a filler 30.

The rigidity variable member 60 is formed in an elongated and cylindrical shape along the longitudinal axis direction N. In addition, the rigidity variable member 60 has a first opening 60h1 at one end portion 60a in the longitudinal axis direction N and has an opening 60h2 at another end portion 60b in the longitudinal axis direction N. The opening 60h2 of the rigidity variable member 60 is closed, and therefore, the rigidity variable member 60 has a recessed shape in a landscape orientation in FIG. 2.

Note that the first opening 60h1 is sealed by an adhesive, or the like, not shown. In addition, also the opening 60h2 of the rigidity variable member 60 formed in a cylindrical shape may be sealed by an adhesive, or the like, not shown.

The rigidity variable member 60 is a member, the rigidity of which increases by being heated and which is made of a known shape memory alloy, the bending rigidity of which increases by being heated by a heater 51 to be described later.

The heater unit 50 is formed in an elongated and cylindrical shape along the longitudinal axis direction N, and is constituted of the heater 51 and a tube 52.

The heater 51 is formed in an elongated and cylindrical shape along the longitudinal axis direction N. The heater 51 is arranged on the inside of the rigidity variable member 60 in a radial direction R and configured to heat the rigidity variable member 60.

In addition, the heater 51 is constituted of a heating member which is pliable and has a small diameter, for example, a coil heater, in order to follow the pliability of the flexible tube portion 2k.

The tube 52 is formed in an elongated and cylindrical shape along the longitudinal axis direction N, and arranged on an inside of the heater 51 in the radial direction R.

In addition, the tube 52 is an insulator and made of a material having a heat conductivity lower than a heat conductivity of the filler 30, for example, a material including polyimide (heat conductivity of which is 0.3 W/m·K). Note that the material constituting the tube 52 is not limited to polyimide as long as the material is a resin material having a heat conductivity lower than that of the filler 30.

The filler 30 is filled into a gap S formed between the heater 51 and the rigidity variable member 60 in the radial direction R. The gap S is created unavoidably in consideration of assemblability of the rigidity variable apparatus 100.

In addition, the filler 30 is preferably made of a non-conductive material in order to ensure insulation to the heater 51. Furthermore, the filler 30 is preferably made of a material having a heat conductivity (high heat conductivity) higher than that of air. Specifically, the filler 30 includes a heat-dissipating silicon potting material (heat conductivity 1.6 W/m·K, for example) or a heat-dissipating silicon adhesive.

Note that the filler 30 may be gelatinous or cured.

The filler 30 fills the gap S instead of gas G having a low heat conductivity, to improve the heat transfer performance of the heater 51 in transferring the heat H to the rigidity variable member 60.

If the gas G having the low heat conductivity is filled into the gap S as described in the above-described conventional example, the heat transfer performance from the heater 51 to the rigidity variable member 60 is decreased by the gas G. Therefore, the rigidity variable apparatus 100 is configured such that the filler 30 having a high heat conductivity is filled into the gap S.

Figure 3:
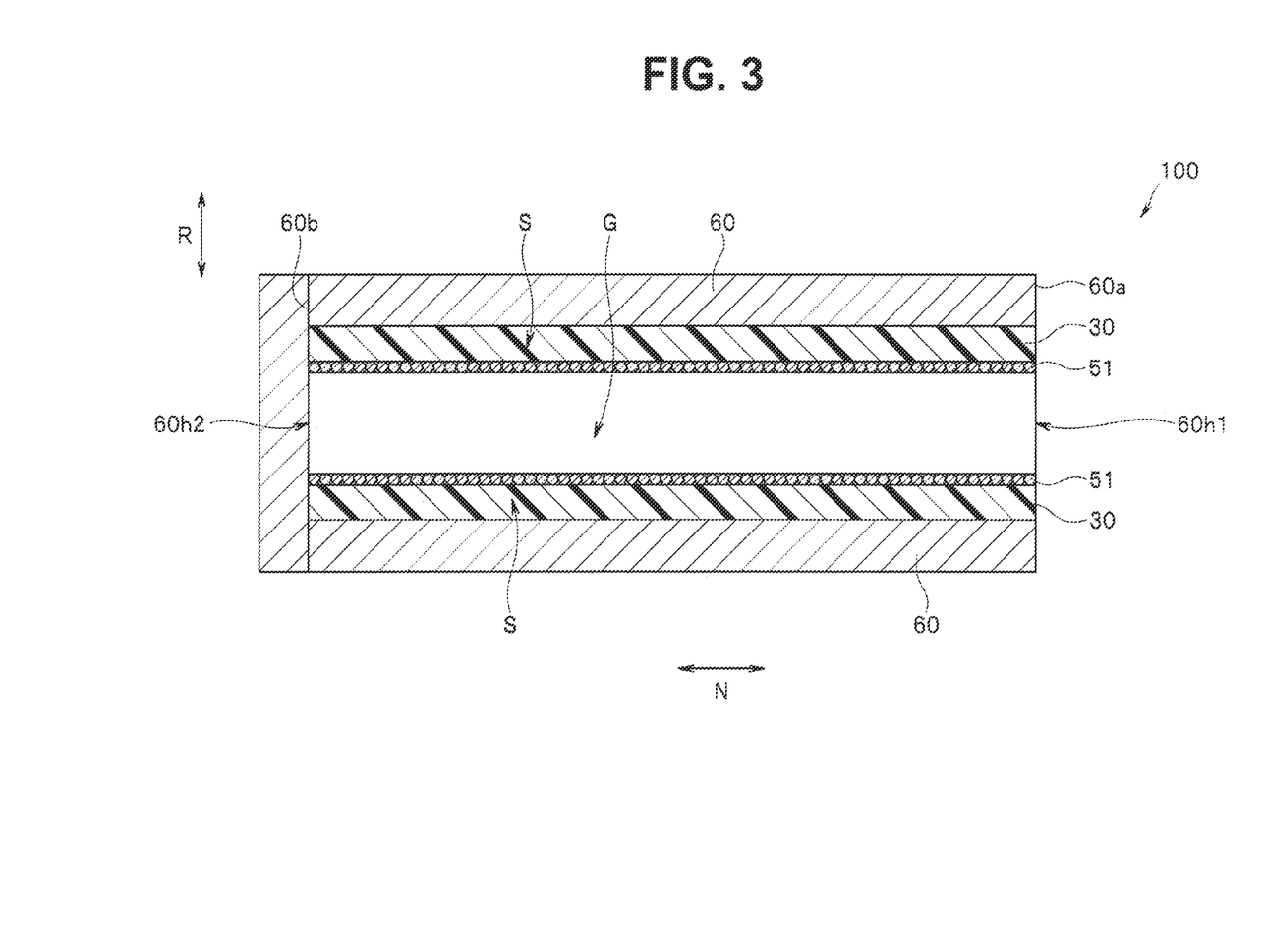
FIG. 3 is a cross-sectional view of the rigidity variable apparatus having a configuration ideal for quickly hardening a rigidity variable member in FIG. 2.

Note that, if an object of the present invention is only to improve the heat transfer performance from the heater 51 to the rigidity variable member 60 by using the filler 30, the rigidity variable apparatus 100, as shown in FIG. 3, does not have to include the tube 52 on the inside of the heater 51 in the radial direction R.

If the gas G having a low heat conductivity (for example, the heat conductivity of air is about 0.02 W/m·K) is filled into the inner side than the heater 51 in the radial direction R, the heat transfer performance from the heater 51 to the gas G is decreased. Therefore, the heat H of the heater 51 should be able to be efficiently transferred to the rigidity variable member 60 through the filler 30.

Figure 4:
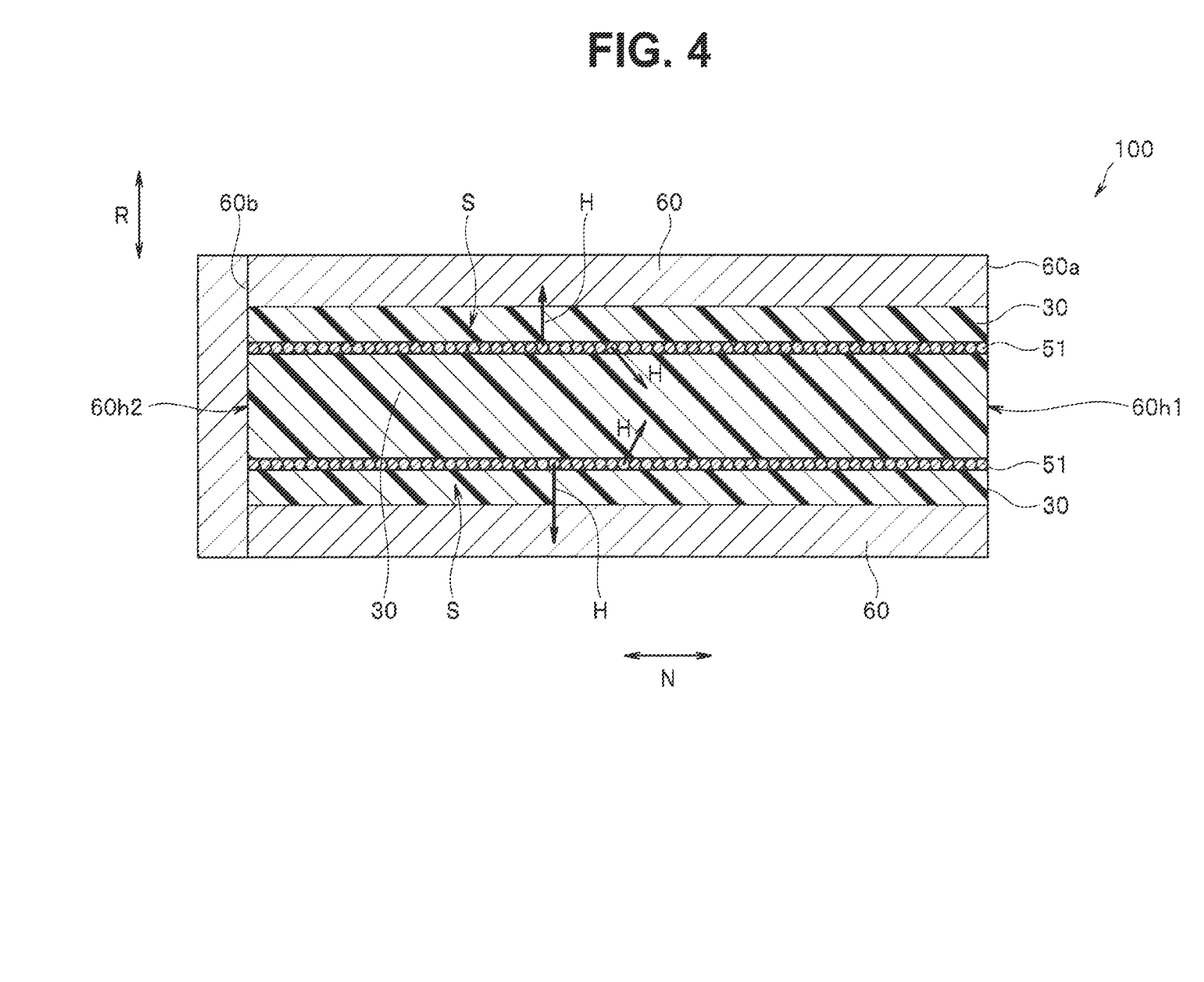
FIG. 4 is a cross-sectional view showing a state where a filler has been filled into an inside of a heater in FIG. 3.

However, if the assemblability of the rigidity variable apparatus 100 is taken into consideration, the filler 30 having the high heat conductivity is filled also into the inner side than the heater 51 in the radial direction R, as shown in FIG. 4. In other words, it is very difficult to manufacture the rigidity variable apparatus 100 shown in FIG. 3. In this case, the heat H of the heater 51 is transferred also to the filler 30 filled into the inner side than the heater 51 in the radial direction R.

Therefore, in the present embodiment, the tube 52 is provided to prevent the filler 30 from entering the inner side than the heater 51 in the radial direction R.

Note that, since the tube 52 is made of the material having the low heat conductivity, as described above, the heat H of the heater 51 is hardly transferred to the tube 52, which enables the heat H of the heater 51 to be efficiently transferred to the rigidity variable member 60 through the filler 30.

Next, description will be made on a manufacturing method of the rigidity variable apparatus 100 according to the present embodiment, with reference to FIG. 5 and FIG. 6.

Figure 5:
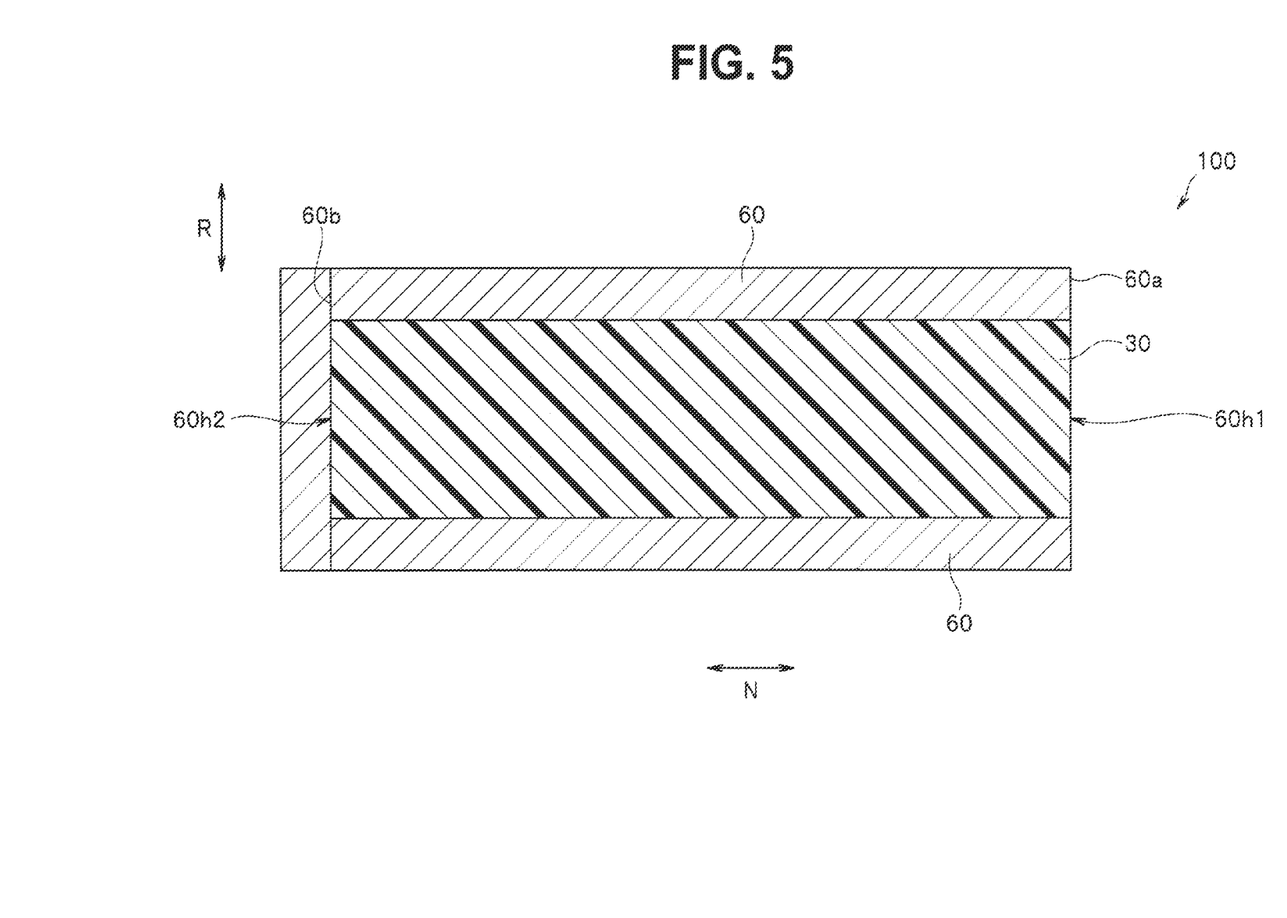
FIG. 5 is a cross-sectional view showing a state where the filler is filled into an inside of the rigidity variable member in a radial direction.

FIG. 5 is a cross-sectional view showing a state where the filler is filled into the inside of the rigidity variable member in the radial direction. FIG. 6 is a cross-sectional view showing a state where the heater unit is pushed into the inside of the rigidity variable member in FIG. 5.

As shown in FIG. 5, first, the filler 30 is filled into the inside of the rigidity variable member 60 in the radial direction R, through the first opening 60$h$1.

Figure 6:
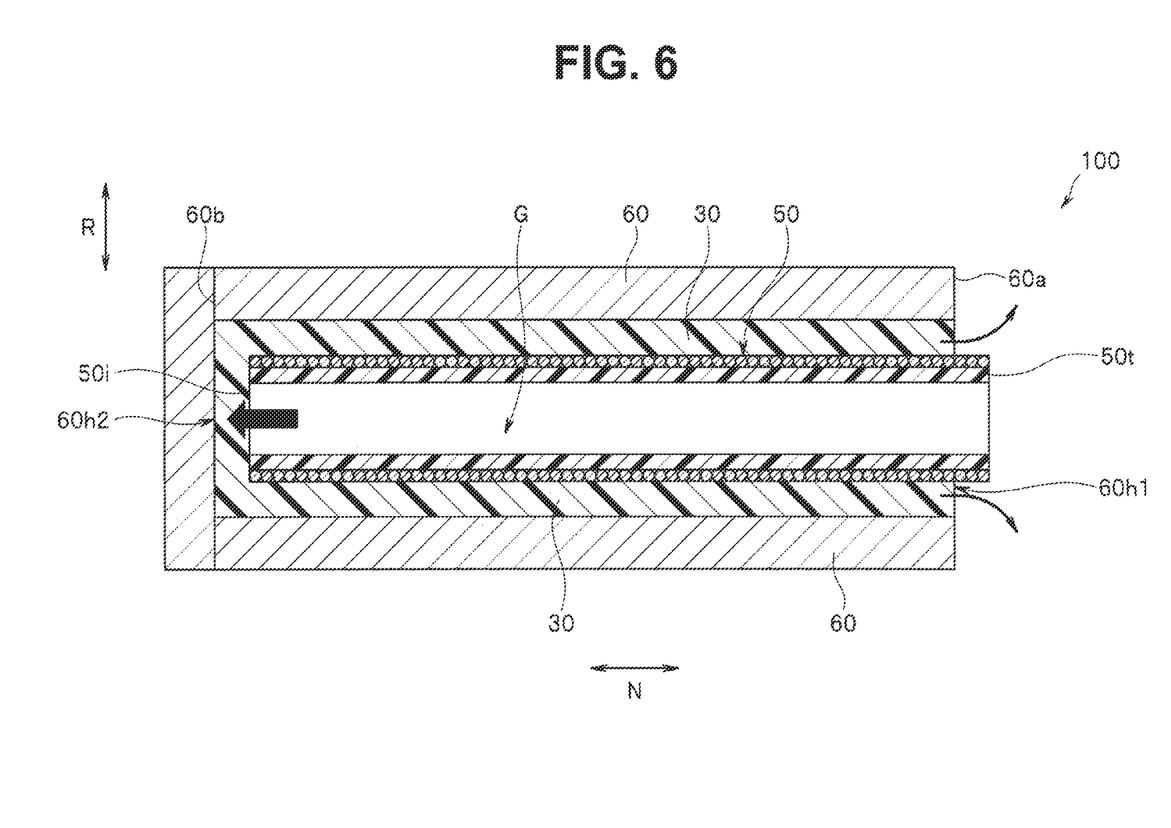
FIG. 6 is a cross-sectional view showing a state where a heater unit in FIG. 2 is pushed into the inside of the rigidity variable member in FIG. 5.

Next, the heater unit 50, the one end 50$i$ of which in the longitudinal axis direction N is closed, is passed, from the one end side 50$i$, through the first opening 60$h$1, to be pushed along the longitudinal axis direction N into the inside of the rigidity variable member 60 in the radial direction R, as shown in FIG. 6.

After that, the filler 30 is filled into the gap S between the heater 51 and the rigidity variable member 60 in the radial direction R. Since the one end 50$i$ of the heater unit 50 is closed, the filler 30 does not enter into the inside of the tube 52 and is filled only into the gap S, while being discharged from the first opening 60$h$1. Finally, after the pushing-in of the heater unit 50 is completed, the first opening 60$h$1 is sealed by an adhesive or the like. As a result, the rigidity variable apparatus 100 shown in FIG. 2 is manufactured.

Thus, in the present embodiment, the filler 30 having the high heat conductivity is filled into the gap S between the heater 51 and the rigidity variable member 60 in the radial direction R.

In addition, the tube 52 having the heat conductivity lower than that of the filler 30 is provided on the inside of the heater 51 in the radial direction R.

With such a configuration, the tube 52 can prevent the state as shown in FIG. 4 in which the filler 30 having the high heat conductivity is filled into the inner side than the heater 51 in the radial direction R. In addition, the tube 52 can effectively prevent the heat H of the heater 51 from being transferred to the inner side than the heater 51 in the radial direction R.

Thus, the heat H of the heater 51 is efficiently transferred to the rigidity variable member 60 through the filler 30 having the high heat conductivity. As a result, the rigidity variable member 60 can be hardened quickly. In other words, when the rigidity variable apparatus 100 is provided in the flexible tube portion 2$k$, a desired part of the flexible tube portion 2$k$ can be hardened quickly.

As described above, it is possible to provide the rigidity variable apparatus 100 having the configuration for enabling the hardening speed of the rigidity variable member 60 to be increased by improving the heat transfer performance from the heater 51 to the rigidity variable member 60, and also provide the endoscope 1 including the rigidity variable apparatus 100, and the manufacturing method of the rigidity variable apparatus 100.

Second Embodiment

Figure 7:
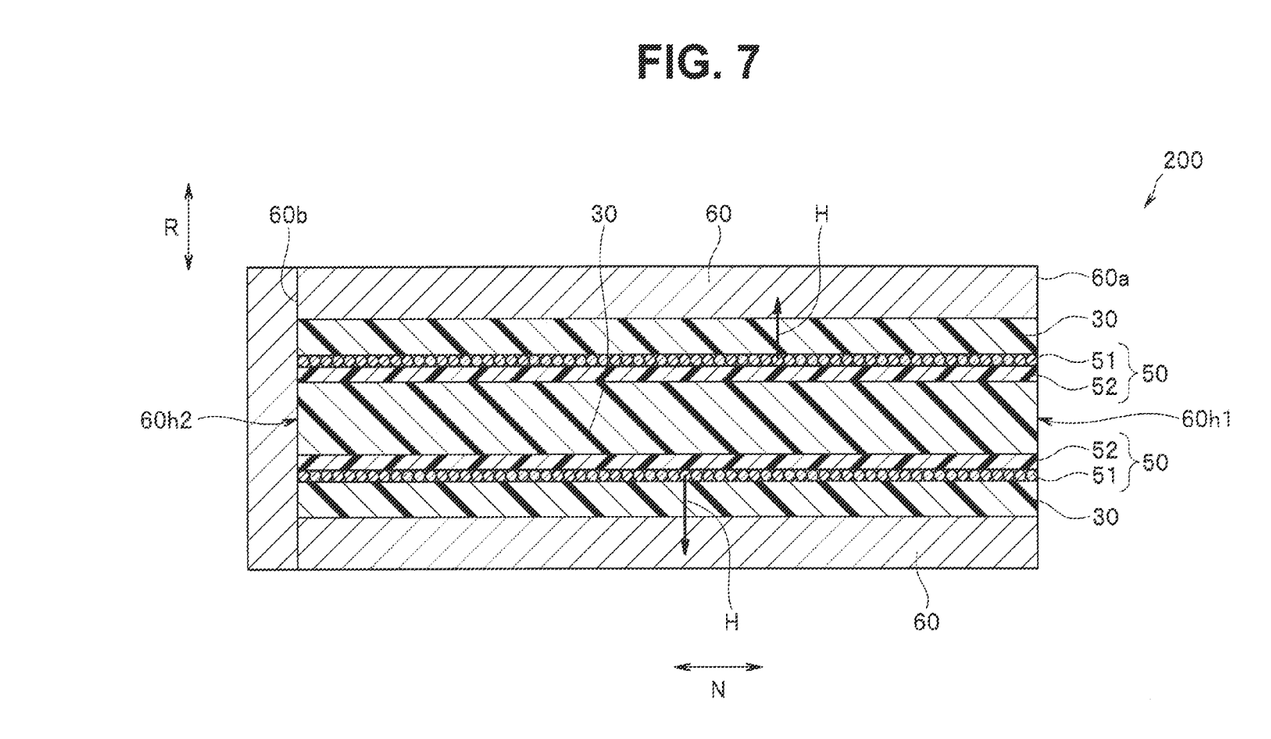
FIG. 7 is a cross-sectional view of a rigidity variable apparatus according to a second embodiment.

FIG. 7 is a cross-sectional view of a rigidity variable apparatus according to the present embodiment.

Configurations of the rigidity variable apparatus and an endoscope according to the second embodiment are different from those of the rigidity variable apparatus and the endoscope according to the first embodiment shown in FIGS. 1 and 2, in that a filler is filled also into an inside of the tube.

Therefore, only the different point will be described, and the same components as those in the first embodiment are attached with the same reference signs and descriptions thereof will be omitted.

As shown in FIG. 7, a rigidity variable apparatus 200 according to the present embodiment is configured such that the filler 30 is filled also into the inside of the tube 52 in the radial direction R.

Note that, even if the filler 30 having the high heat conductivity is filled into the inside of the tube 52 in the radial direction R, the tube 52 prevents the heat H of the heater 51 from being transferred to the filler 30 arranged on the inside of the tube 52 in the radial direction R.

Other configurations of the rigidity variable apparatus 200 are the same as those of the rigidity variable apparatus 100 in the first embodiment.

Next, description will be made on a manufacturing method of the rigidity variable apparatus 200 according to the present embodiment, with reference to FIG. 5 and FIG. 8.

Figure 8:
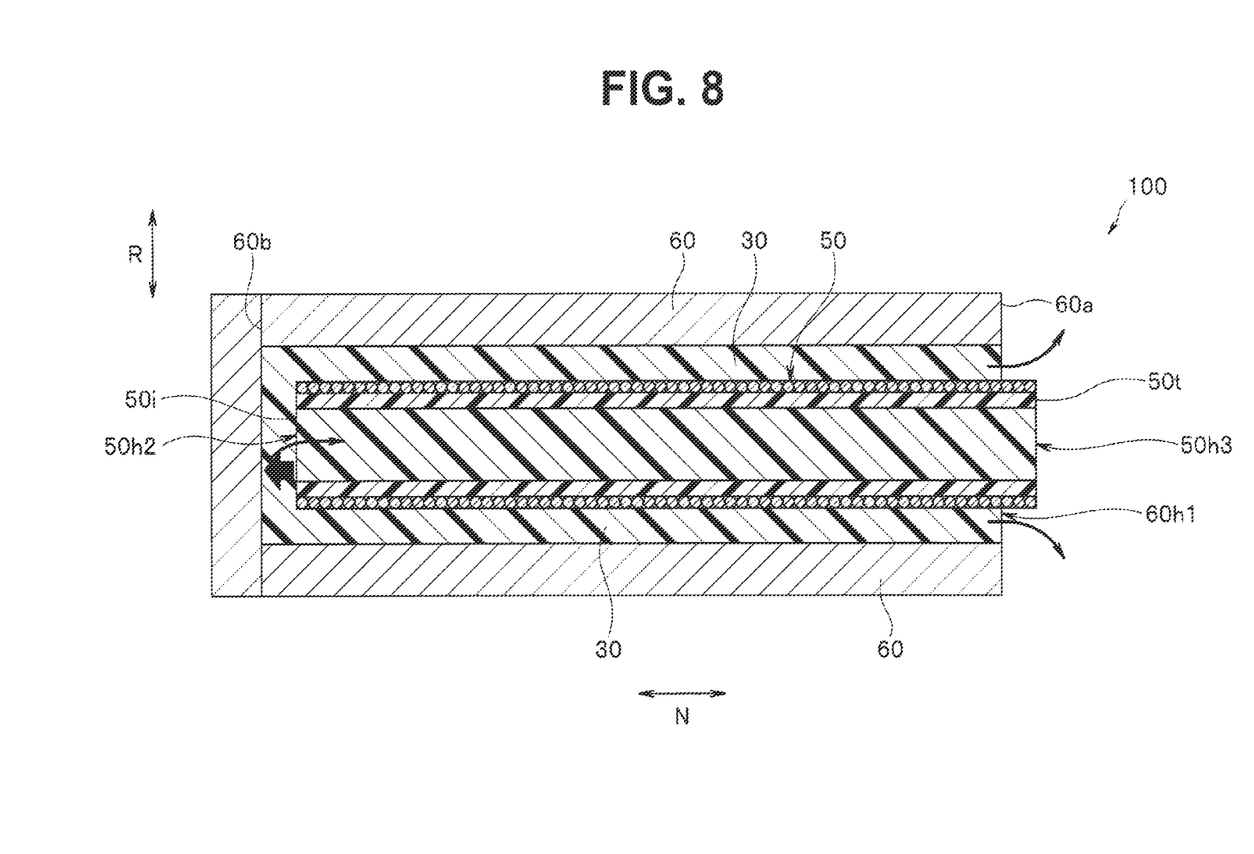
FIG. 8 is a cross-sectional view showing a state where a heater unit in FIG. 7 is pushed into the inside of the rigidity variable member in FIG. 5.

FIG. 8 is a cross-sectional view showing a state where the heater unit in FIG. 7 is pushed into the inside of the rigidity variable member in FIG. 5.

As shown in FIG. 5, first, the filler 30 is filled into the inside of the rigidity variable member 60 in the radial direction R, through the first opening 60h1.

Next, the heater unit 50, which includes a second opening 50h2 at one end 50i in the longitudinal axis direction N and a third opening 50h3 at another end 50t in the longitudinal axis direction N, is passed, from the one end 50i side, that is, the second opening 50h2 side, through the first opening 60h1, to be pushed into the inside of the rigidity variable member 60, as shown in FIG. 6.

After that, the filler 30 enters the inside of the tube 52 through the second opening 50h2, to be discharged from the third opening as well as from the first opening 60h1. Furthermore, the filler 30 is filled into the gap S between the heater 51 and the rigidity variable member 60 in the radial direction R as well as into the inside of the tube 52 in the radial direction R.

Finally, after the pushing-in of the heater unit 50 is completed, the first opening 60h1 is sealed by an adhesive or the like. As a result, the rigidity variable apparatus 200 shown in FIG. 7 is manufactured.

With also such a configuration, the same effects as those in the above-described first embodiment can be obtained. In addition, in the case where the gap S is extremely small in the radial direction R or in the case where the viscosity of the filler 30 is high, for example, in the configuration of the rigidity variable apparatus 100 in the first embodiment, it is very difficult to fill the filler 30 only into the gap S by the pushing-in of the heater unit 50.

Specifically, it is very difficult to push the heater unit 50 into the inside of the rigidity variable member 60 while allowing the filler 30 to be discharged from the first opening 60h1, as shown in FIG. 6.

However, according to the configuration and the manufacturing method of the rigidity variable apparatus 200 according to the present embodiment, when the heater unit 50 is pushed into the inside of the rigidity variable member 60, while allowing the filler 30 to be discharged from the first opening 60h1, as shown in FIG. 8, the filler 30 enters also the inside of the tube 52 through the second opening 50h2, to be discharged from the third opening 50h3. With such a configuration, it is easy to push the heater unit 50 into the rigidity variable member 60. Therefore, the rigidity variable apparatus 200 can be surely manufactured.

Figure 9:
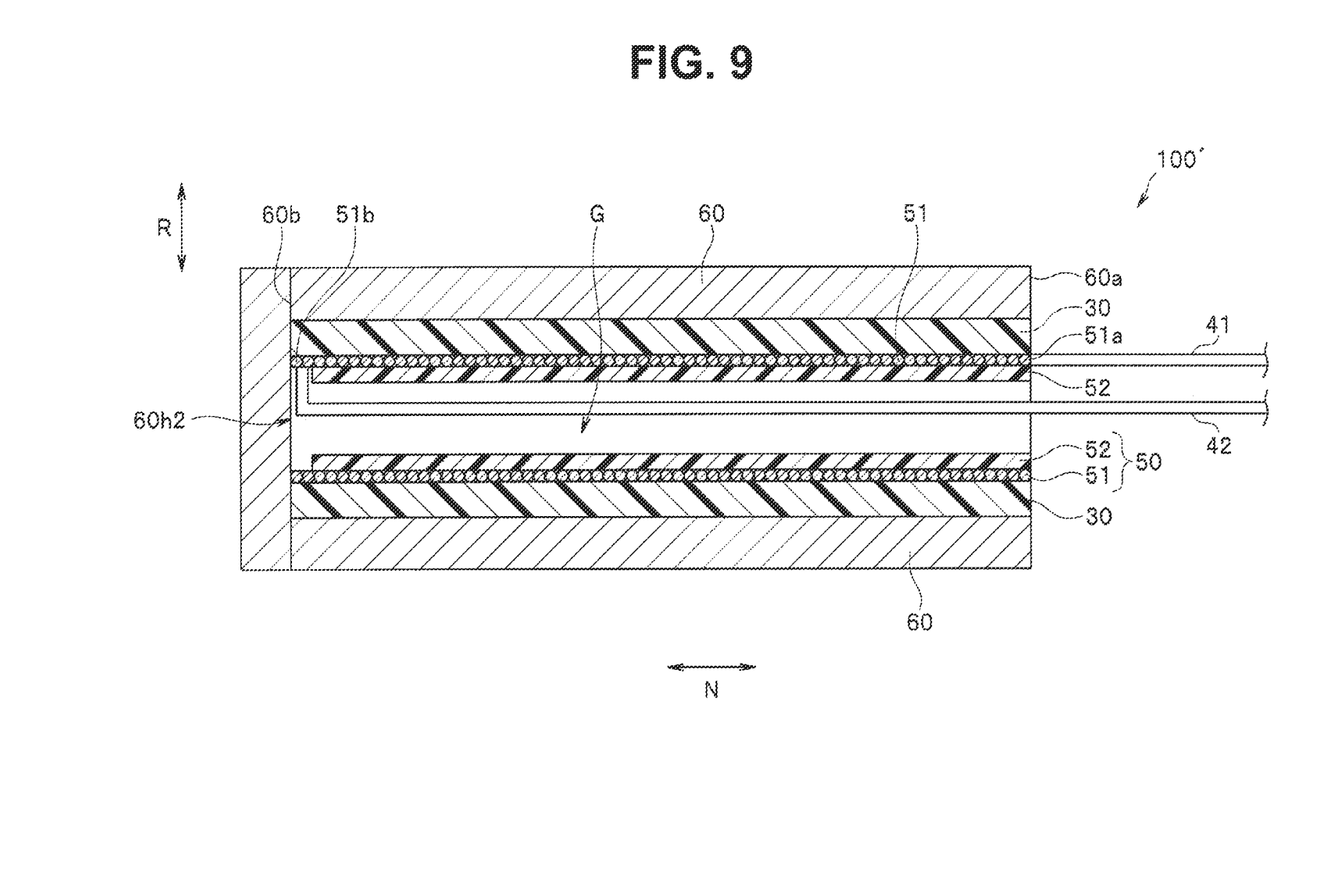
FIG. 9 is a cross-sectional view showing a state where conductive wires are extended respectively from one end and another end of a heater in the rigidity variable apparatus in FIG. 2.
Figure 10:
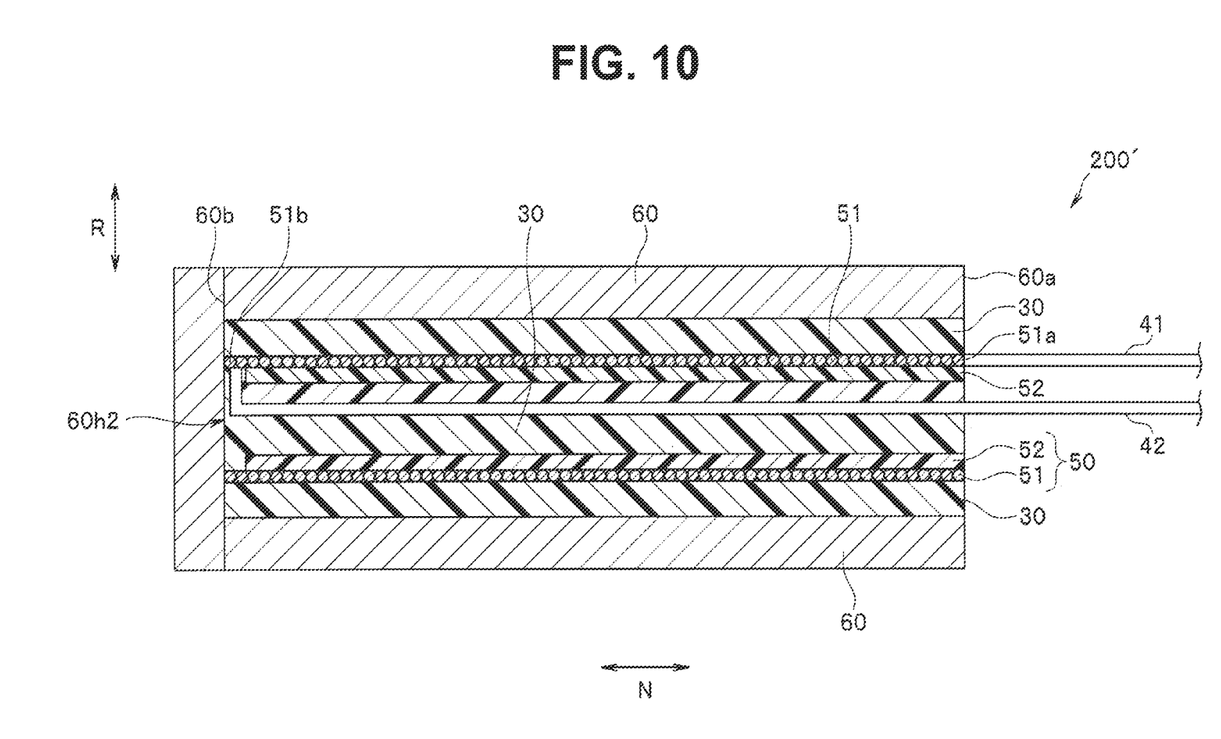
FIG. 10 is a cross-sectional view showing a state where conductive wires are extended respectively from one end and another end of a heater in the rigidity variable apparatus in FIG. 7.

Description will be made below on a modification, with reference to FIG. 9 and FIG. 10. FIG. 9 is a cross-sectional view showing a state where conductive wires are extended respectively from one end and another end of the heater in the rigidity variable apparatus in FIG. 2. FIG. 10 is a cross-sectional view showing a state where conductive wires are extended respectively from one end and another end of the heater in the rigidity variable apparatus in FIG. 7.

In the above-described first and second embodiments, the heater 51 is required to be energized in order to generate the heat H from the heater 51.

When the heater 51 is configured of a coil heater, the heater 51 is configured to generate heat by a current flowing between one end 51a and another end 51b of a wound heating wire that configures the coil heater.

Usually, a first conductive wire 41 is extended from the one end 51a, and a second conductive wire 42 is extended from the other end 51b. Note that the first conductive wire 41 and the second conductive wire 42 are each connected to a power source, not shown. In addition, both the first conductive wire 41 and the second conductive wire 42 configure the heating wire.

However, if the gap S is small in the radial direction R, there is a possibility that the second conductive wire 42 cannot be passed through the gap S.

Therefore, as shown in FIG. 9 and FIG. 10, in rigidity variable apparatuses 100' and 200', the second conductive wire 42 may be arranged so as to pass through the inside of the tube 52 in the radial direction R. In this case, there is no need for passing the second conductive wire 42 through the gap S. As a result, it is possible to reduce the diameters of the rigidity variable apparatuses 100' and 200' in the radial direction R.

Note that the heater 51 usually has a configuration in which the outer circumference of the heating wire is covered with an insulation coating film. If the insulation coating film is broken, the heating wire is likely to make a short circuit to the second conductive wire 42 passing through the inside of the tube 52 in the radial direction R. However, as described above, the tube 52 is configured of an insulator, to thereby prevent the short circuit.

In other words, the tube 52 may have a function of preventing a short circuit between the heating wire and the second conductive wire 42 in the heater 51.

Note that other effects are the same as those in the above-described first and second embodiments.

In addition, in the above-described first and second embodiments, the endoscope has been described by taking a colonoscope for medical use as an example. However, the present invention is applicable not only to the colonoscope, but also to other medical endoscopes and industrial endoscopes.

Furthermore, the rigidity variable apparatuses 100, 200, 100', and 200' according to the first and second embodiments may be provided in an insertion portion of a treatment instrument.

Furthermore, the present invention is not limited to the above-described embodiments, but can be changed appropriately within a range not departing from the gist or the concept of the invention that can be read from claims, throughout the specification, and the drawings.

What is claimed is:

1. A rigidity variable apparatus comprising:
   a rigidity variable member having a cylindrical shape, a bending rigidity of the rigidity variable member increasing by being heated;
   a heater having a cylindrical shape and arranged along the rigidity variable member on an inside of the rigidity variable member in a radial direction, the heater being configured to heat the rigidity variable member;

a filler arranged so as to fill a gap between the heater and the rigidity variable member in the radial direction, the filler being configured to transfer heat from the heater to the rigidity variable member; and a tube arranged along the heater on an inside of the heater in the radial direction.

2. The rigidity variable apparatus according to claim 1, wherein the tube has a heat conductivity lower than a heat conductivity of the filler.

3. The rigidity variable apparatus according to claim 1, wherein the filler is further filled into an inside of the tube in the radial direction.

4. The rigidity variable apparatus according to claim 1, wherein the tube is an insulator, the heater includes a heating wire configured to generate heat by a current flowing between one end and another end of the heating wire, the heater further includes a first conductive wire extended from the one end of the heating wire, and a second conductive wire extended from the other end of the heating wire, and the second conductive wire is arranged so as to pass through an inside of the tube in the radial direction.

5. The rigidity variable apparatus according to claim 1, wherein gas having a heat conductivity lower than a heat conductivity of the filler is filled into an inside of the tube in the radial direction.

6. The rigidity variable apparatus according to claim 1, wherein the tube is made of a material including polyimide.

7. The rigidity variable apparatus according to claim 1, wherein the filler includes at least one of a silicon potting material and a silicon adhesive.

8. The rigidity variable apparatus according to claim 1, wherein the rigidity variable member is made of a shape memory alloy, a bending rigidity of which increases by being heated by the heater.

9. The rigidity variable apparatus according to claim 1, wherein the tube has a cylindrical shape, one end of which is sealed.

10. An endoscope comprising:

an insertion portion; and a rigidity variable apparatus provided in the insertion portion;

the rigidity variable apparatus comprising:

a rigidity variable member having a cylindrical shape, a bending rigidity of the rigidity variable member increasing by being heated;

a heater having a cylindrical shape and arranged along the rigidity variable member on an inside of the rigidity variable member in a radial direction, the heater being configured to heat the rigidity variable member;

a filler arranged so as to fill a gap between the heater and the rigidity variable member in the radial direction, the filler being configured to transfer heat from the heater to the rigidity variable member; and a tube arranged along the heater on an inside of the heater in the radial direction.

11. The endoscope according to claim 10, wherein the tube has a heat conductivity lower than a heat conductivity of the filler.

12. The endoscope according to claim 10, wherein the filler is further filled into an inside of the tube in the radial direction.

13. The endoscope according to claim 10, wherein the tube is an insulator, the heater includes a heating wire configured to generate heat by a current flowing between one end and another end of the heating wire, the heater further includes a first conductive wire extended from the one end of the heating wire, and a second conductive wire extended from the other end of the heating wire, and the second conductive wire is arranged so as to pass through an inside of the tube in the radial direction.

14. The endoscope according to claim 10, wherein gas having a heat conductivity lower than a heat conductivity of the filler is filled into an inside of the tube in the radial direction.

15. The endoscope according to claim 10, wherein the tube is made of a material including polyimide.

16. The endoscope according to claim 10, wherein the filler includes at least one of a silicon potting material and a silicon adhesive.

17. The endoscope according to claim 10, wherein the rigidity variable member is made of a shape memory alloy, a bending rigidity of which increases by being heated by the heater.

18. A manufacturing method of a rigidity variable apparatus comprising:

filling a filler into an inside of a rigidity variable member in a radial direction, the rigidity variable member being formed in a cylindrical shape having a first opening at one end portion, a bending rigidity of the rigidity variable member increasing by being heated, the filler being filled through the first opening; and passing a heater unit having a cylindrical shape through the first opening and pushing the heater unit into the inside of the rigidity variable member, the heater unit including a heater having a cylindrical shape and a tube arranged on an inside of the heater in the radial direction, to arrange the filler so as to fill a gap between an inner circumferential surface of the rigidity variable member and the heater.

19. The manufacturing method of the rigidity variable apparatus according to claim 18, wherein the heater unit includes one end which is closed, the heater unit is pushed, from a side of the one end, into the inside of the rigidity variable member, and the filler is filled between the heater and the rigidity variable member in the radial direction, while being discharged from the first opening of the rigidity variable member.

20. The manufacturing method of the rigidity variable apparatus according to claim 18, wherein the heater unit includes a second opening formed at one end of the heater unit and a third opening formed at another end of the heater unit, the heater unit is pushed, from a side of the second opening, into the inside of the rigidity variable member, and the filler is filled between the heater and the rigidity variable member in the radial direction while being discharged from the first opening of the rigidity variable member, enters from the second opening into an inside of the heater unit in the radial direction, and is discharged from the third opening.

* * * * *